United States Patent
Klinger et al.

(10) Patent No.: US 10,877,805 B2
(45) Date of Patent: Dec. 29, 2020

(54) OPTIMIZATION OF MEMORY USAGE BY INTEGRATION FLOWS

(71) Applicant: International Business Machines Corporation, Armonk, NY (US)

(72) Inventors: Doina L. Klinger, Winchester (GB); Anthony D. Curcio, Matthews, NC (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/131,345

(22) Filed: Sep. 14, 2018

(65) Prior Publication Data

US 2020/0089539 A1 Mar. 19, 2020

(51) Int. Cl.
*G06F 9/50* (2006.01)
*G06F 16/25* (2019.01)
*G06F 16/23* (2019.01)

(52) U.S. Cl.
CPC ........ *G06F 9/5016* (2013.01); *G06F 16/2365* (2019.01); *G06F 16/254* (2019.01)

(58) Field of Classification Search
CPC ... G06F 9/5016; G06F 16/254; G06F 16/2365
See application file for complete search history.

(56) References Cited

U.S. PATENT DOCUMENTS

| | | | |
|---|---|---|---|
| 6,604,110 B1* | 8/2003 | Savage | G06F 16/254 707/602 |
| 7,065,760 B2 | 6/2006 | Dmitriev | |
| 7,089,390 B2 | 8/2006 | Hemsing | |
| 8,479,157 B2 | 7/2013 | Trefler | |
| 2005/0251533 A1* | 11/2005 | Harken | G06F 17/2247 |
| 2012/0254259 A1* | 10/2012 | McGuire | G06F 16/25 707/804 |

(Continued)

FOREIGN PATENT DOCUMENTS

WO 2006051150 A1 5/2006

OTHER PUBLICATIONS

Dessloch et al. Orchid: Integrating Schema Mapping and ETL. [online] IEEE., pp. 1307-1316. Retrieved From the Internet <https://ieeexplore.ieee.org/stamp/stamp.jsp?arnumber=4497540> (Year: 2008).*

(Continued)

*Primary Examiner* — Emerson C Puente
*Assistant Examiner* — Jonathan R Labud
(74) *Attorney, Agent, or Firm* — Timothy J. Singleton

(57) ABSTRACT

Systems, methods and computer program products are provided. Metadata associated with an integration flow comprising a sequence of nodes are received. The metadata identifies data in one or more data objects used by the nodes of the integration flow. In response to initiation of the integration flow, an input data object is received. Initial context data for the integration flow are extracted, from the input data object, based on the metadata. The context data is processed at each of the nodes of the integration flow, wherein one or more of the nodes adds data from its output data object to the context data based on the metadata. Remaining data from the output data objects of one or more of the nodes which was not added to the context data based on the metadata is discarded.

20 Claims, 6 Drawing Sheets

(56) References Cited

U.S. PATENT DOCUMENTS

2014/0172964 A1 6/2014 Lyons
2017/0257429 A1 9/2017 Hosie

OTHER PUBLICATIONS

IBM_Rob, "V10 Performance Highlights", IBM Integration, Updated on Oct. 27, 2015, 4 pages, <https://developer.ibm.com/integration/docs/ibm-integration-bus/performance/v10-performance-highlights/>.

Intel Corporation, "How to Reduce Your Data Center Footprint", CodeProject, Jun. 14, 2017, 5 pages, <https://www.codeproject.com/Articles/1191901/How-to-Reduce-Your-Data-Center-Footprint>.

Mell et al., "The NIST Definition of Cloud Computing", National Institute of Standards and Technology, Special Publication 800-145, Sep. 2011, 7 pages.

* cited by examiner

OPTIMIZATION OF MEMORY USAGE BY INTEGRATION FLOWS

BACKGROUND

The present disclosure relates to integration flows, and, more specifically, to the optimization of memory usage by integration flows.

SUMMARY

According to an aspect of the present disclosure, a computer-implemented method is provided. The method receives metadata associated with an integration flow comprising a sequence of nodes. The metadata identifies data in one or more data objects used by the nodes of the integration flow. In response to initiation of the integration flow, the method receives an input data object. The method extracts, from the input data object, initial context data for the integration flow based on the metadata. The method processes the context data at each of the nodes of the integration flow, wherein one or more of the nodes adds data from its output data object to the context data based on the metadata. Remaining data from the output data objects of one or more of the nodes which was not added to the context data based on the metadata is discarded.

According to another aspect of the present disclosure, a system for implementing an integration flow is provided. The system comprises a processor for processing data associated with an integration flow comprising a sequence of nodes, and memory for storing data associated with the integration flow. The processor is configured to receive metadata associated with the integration flow. The metadata identifies data in one or more data objects used by the nodes of the integration flow. The processor is further configured to receive, in response to initiation of the integration flow, an input data object. The processor is configured to extract, from the input data object, initial context data for the integration flow based on the metadata. The processor is further configured to process the context data at each of the nodes of the integration flow, wherein one or more of the nodes adds data from its output data object to the context data based on the metadata. The processor is further configured to discard remaining data from the output data objects of one or more of the nodes which was not added to the context data based on the metadata.

According to yet another aspect of the present disclosure, a computer program product is provided. The computer program product comprises a computer readable storage medium having program instructions embodied therewith. The program instructions are executable by a processor to cause the processor to: receive metadata associated with an integration flow comprising a sequence of nodes. The metadata identifies data in one or more data objects used by the nodes of the integration flow. The program instructions are further executable by a processor to cause the processor to: receive, in response to initiation of the integration flow, an input data object; extract, from the input data object, initial context data for the integration flow based on the metadata; process the context data at each of the nodes of the integration flow, wherein one or more of the nodes adds data from its output data object to the context data based on the metadata; and discard remaining data from the output data objects of one or more of the nodes which was not added to the context data based on the metadata.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Example implementations of the present disclosure will be described below with reference to the following drawings.

Figure 1:
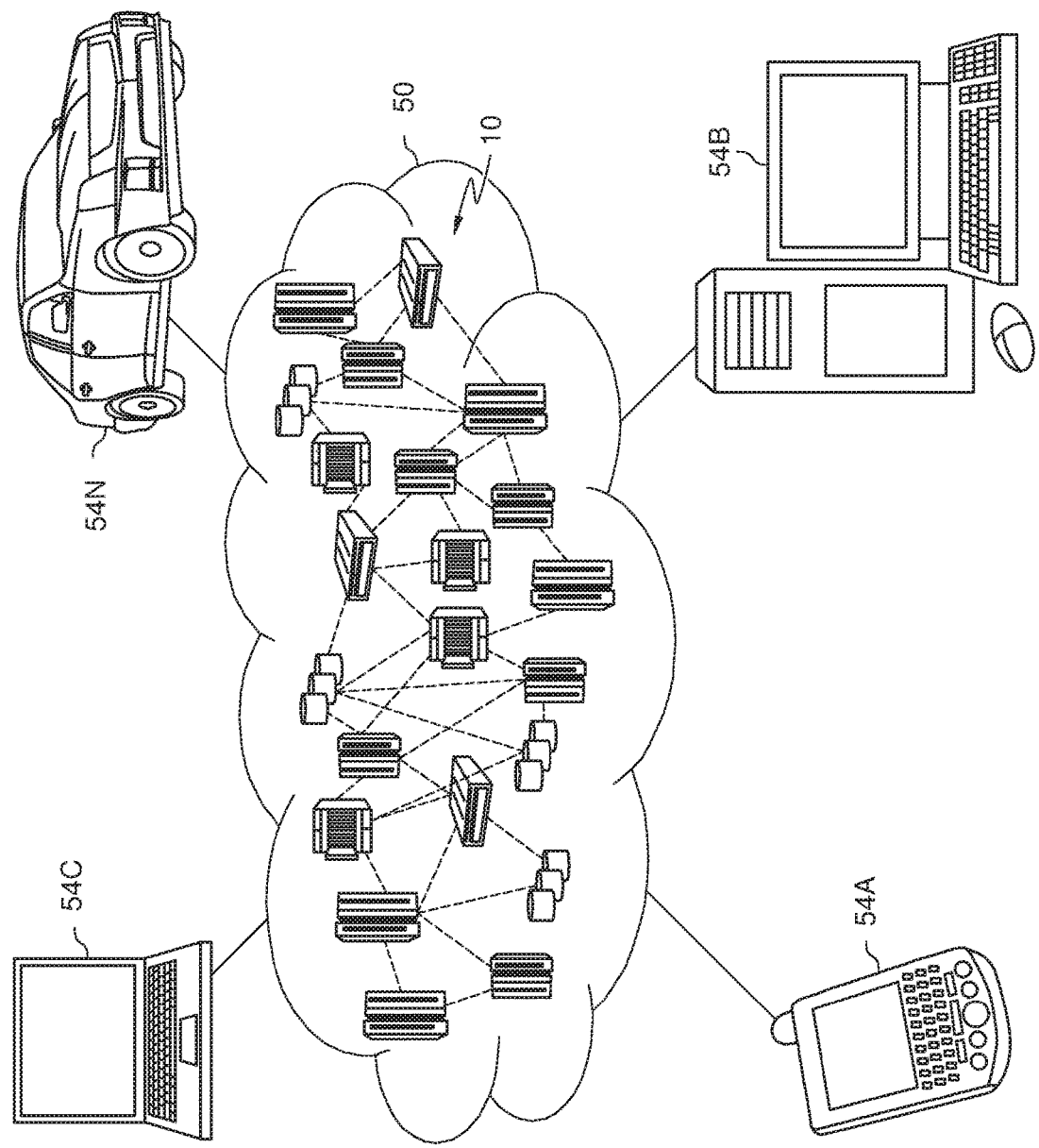
FIG. 1 illustrates a cloud computing environment according to some example embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Integration flows are increasingly used by enterprises to integrate enterprise applications and other applications (e.g., third party applications) for the purpose of business process streamlining and workflow management. An integration flow comprises an organized flow of operations or processes performed on one or more nodes. Integration flows may be triggered or initiated in response to a condition or action, such as a triggering event. In an event-driven integration flow, a triggering event in a first or source application is identified, as well as actions that can be performed in one or more target applications. The integration flow links the event to these actions so that whenever the event occurs, the actions are automatically triggered in the target applications. Integration flows can also be initiated upon a condition or action associated with an application programming interface (API), data synchronization, data replication, or the like. An integration flow for an API can contain a request, one or more target application actions, and a response. The request can use a model that is defined to request the creation, replacement, or retrieval of data objects in an application. When the request is submitted, each target application performs its action, and then the flow can return a response that either confirms that the actions were successful, or returns the data that was requested.

An integration flow is typically developed using an integration tool, which allows the user to define a sequence of nodes comprising operation nodes and logic nodes. Operation nodes typically represent an interaction with a connector application (herein also referred to as a "connector") such as a third-party application (herein a "connector operation"), whilst a logic node determines the route through the flow based on an output of a logic condition or similar decision step (herein a "route operation"). In the case of an event-driven and action based integration flow, a triggering event may provide input data to an input node at the start of a flow. In the case of an API, the parameters passed to the API may provide input data to an input node at the start of a flow. The input data represents the initial "context" of the integration flow. Each subsequent node uses context objects as arguments or inputs to its operation (e.g., data from one action that has happened earlier in the flow which can be used to specify attributes of later actions) and adds its output to the context for the next node. Thus, the integration flow builds up the context structure by adding data to the context.

For each operation node, the user defines a mapping of one or more data fields of data objects from the input context to its output, which represents the connector operation. Similarly, for each logic node, the user defines a logic condition that is evaluated based on one or more data fields of data objects from the input context and provides an output, which determines a next node of at least two alternative nodes, and thus a route through the integration flow. Mapping can describe how the fields of the action object are created (mapped) from the data that is available to the flow.

A connector operation performed by an operation node may involve a large amount of data, which is carried forward in memory as part of the context. Typically, the user has no control over the shape of the data objects added to the context. For example, when an operation node obtains an object from a third-party application, a relatively large data object may be returned and stored as part of the context, even though only a limited amount of that data is subsequently used by the nodes in the integration flow. Storing unnecessary data in memory at each node as part of the context increases the memory usage of the integration flow, which can be an inefficient use of memory resources. In addition, when implementing the integration flow in a cloud environment, the user may incur unnecessary financial costs if the charging mode of the cloud service provider is based on memory consumption (i.e., data storage).

The present disclosure provides a method, system, and computer program product, for optimizing the memory usage or "memory footprint" when executing an integration flow, so as to conserve the use of memory resources. It is to be understood that although this disclosure includes a detailed description on cloud computing, implementations of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
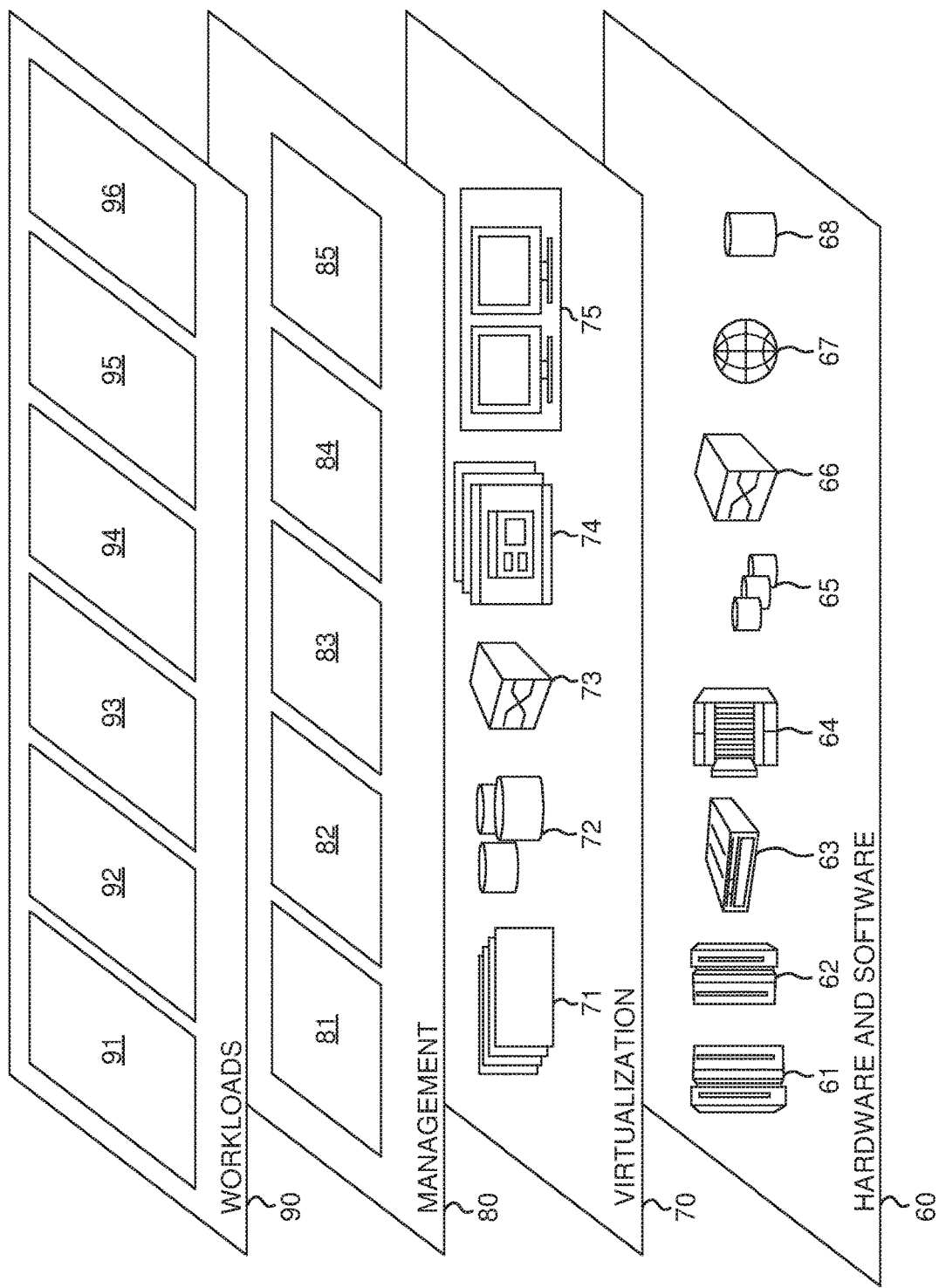
FIG. 2 illustrates abstraction model layers according to some example embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and implementations of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some example implementations, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and integration flow 96.

As described above, an integration flow comprises a user-defined sequence of nodes. Each node defines a mapping of context objects comprising data fields that are used by the node to provide its output (i.e., data used as arguments/inputs to its processing or logic operation). Some nodes may retrieve a data object (e.g., from a third-party application or other connector) containing large amounts of data that are not needed by the nodes of the integration flow. Conventionally, a data object retrieved by a node is added to the context of the integration flow, and therefore stored in memory and carried forward by each subsequent node in the flow. When any one or more data objects contain data fields that are not required by the user in the rest of the integration flow, this leads to an undesirable increase in the memory consumption or "memory footprint" of the integration flow, which is inefficient.

Figure 3:
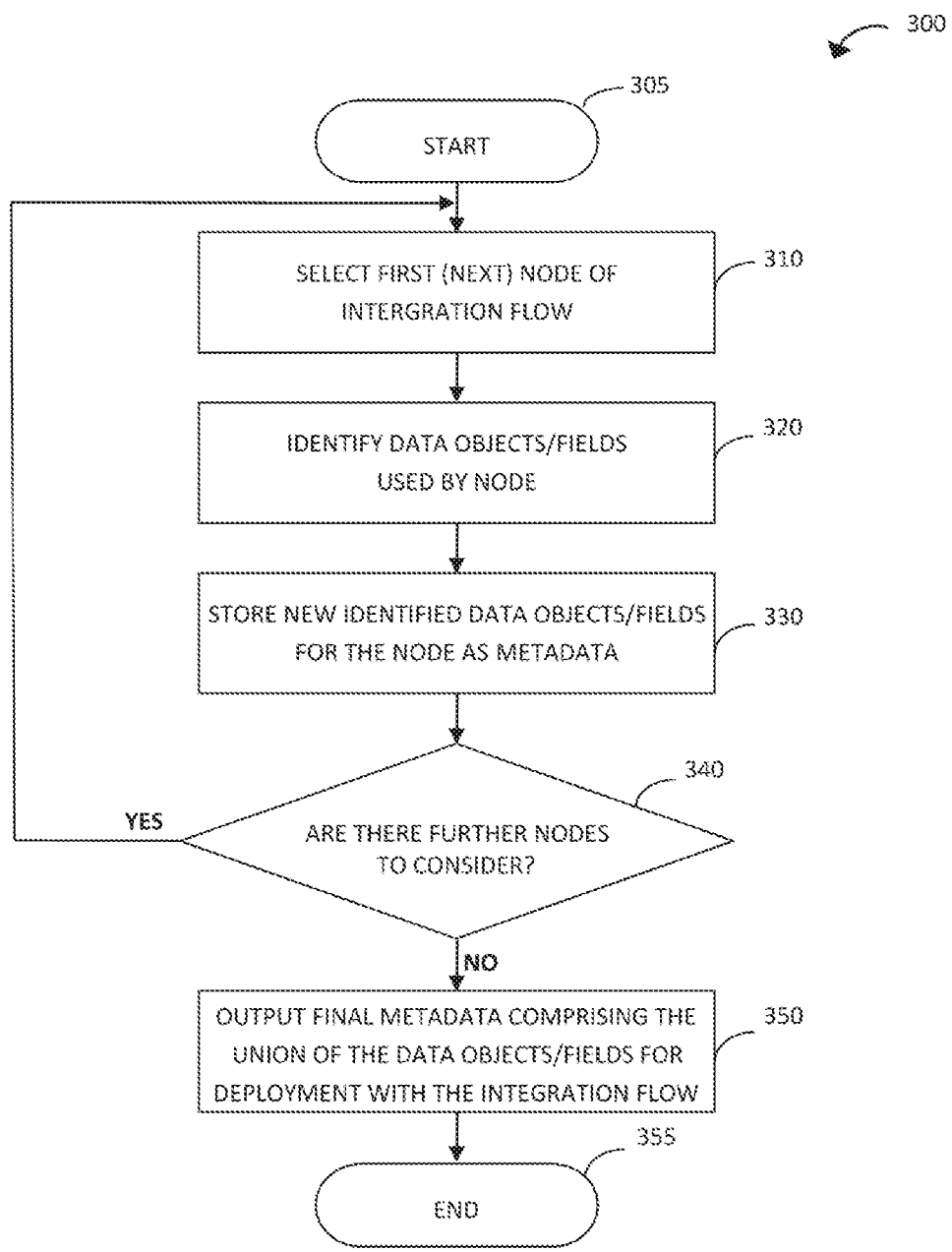
FIG. 3 is a flowchart of a method of analysis of an integration flow according to some example embodiments of the present disclosure.

FIG. 3 is a flowchart of a method 300 of analysis of an integration flow, for use in optimizing memory usage, in accordance with some example embodiments of the present disclosure. In particular, the method 300 performs static analysis of the integration flow definition prior to deployment of the integration flow in a runtime environment. In example embodiments, the method 300 may be performed as part of an integration tool, which enables a user to define integration flows. It is to be understood that the method can be implemented by (and, hence, can be performed by) a computer, a processor, a memory controller, firmware or software running on a computer system, or other component(s) of a computer system (such as computing system 600 or its components shown in FIG. 6.). Method 300 can include more or fewer blocks than those depicted. Method 300 can include blocks in different orders than those depicted, including one or more blocks occurring simultaneously.

The method starts at 305. For example, the method 300 may start in response to a user of an integration tool confirming that a newly defined integration flow is ready for deployment.

At 310, the method selects the first node of the integration flow. At 320, the method analyzes the mapping definition of the selected node and identifies the data objects/fields used in the node operation. In particular, the mapping definition for the node indicates the input operands (i.e., arguments) and the outputs, and at 320 the method identifies all the input operands for the node operation. Thus, in the case that the node operation performs multiple mathematical functions, the input operands for all of the mathematical functions are identified. Furthermore, some nodes (e.g., container nodes, such as an "if," node, or looping nodes) may contain other nodes, in which case all of the input operands used are identified (e.g., using a recursive process). In particular, the input operands for the operation of the particular node and the input operands for the operations of each of the nodes contained within that particular node are identified.

At 330, the method stores the identified objects/fields as usage metadata (herein simply called "metadata") for the corresponding node for the integration flow in memory. In particular, at 330 the method may store an identifier of each data field of a data object used by the node as an input operand.

At 340, the method determines whether there are further nodes of the integration flow to consider. If the method determines at 340 that there are further nodes to be considered, the method returns to 310 and selects the next node. The method continues in a loop through 310, 320, 330, and 340, where at 330 the method stores identifiers of new identified data objects/fields used by the node as the metadata.

It will be appreciated that identified data fields of data objects are contained in a data object added to the context by a previous node. Thus, in an example implementation of the present disclosure, the identifier of each data object/field may indicate the node that adds the data object to the context. Furthermore, a data field of a data object may be used by the previous node, and so may already be indicated in the metadata associated with that node. Thus, in accordance with the example implementation of FIG. 3, at 330 the method only adds new data fields of data objects to the metadata (i.e., data fields of data objects not previously used by previous nodes). These concepts are further illustrated by the example described below.

When the method determines at 340 that there are no further nodes to consider, the method optionally proceeds to 350. At 350, the method outputs final metadata for deployment with the integration flow. In particular, the final metadata comprises all the data fields of the data objects used by the individual nodes of the integration flow. In each case, the final metadata identifies a data object with reference to the node of the flow that adds that data object to the context. Thus, the final metadata represents all the data objects/fields used by the integration flow. At 350 the method may store the final metadata together with the integration flow (e.g., in memory associated with the integration flow in the integration tool) prior to deployment (e.g., deployment of the integration flow on an integration server or the like, as described below). The method 300 then ends at 355.

As a person of ordinary skill in the art will appreciate, the method 300 identifies metadata comprising a union of all the data fields of the data objects used by all of the nodes of the integration flow. Significantly, the metadata identifies all the data fields of the input context of the nodes that can possibly be utilized by the integration flow, including those data fields that are only utilized dependent upon the route followed through the integration flow. As a person of ordinary skill in the art will appreciate, other techniques for identifying the usage metadata of an integration flow, by analysis of the integration flow definition or otherwise, are possible and contemplated by the present disclosure.

Figure 4:
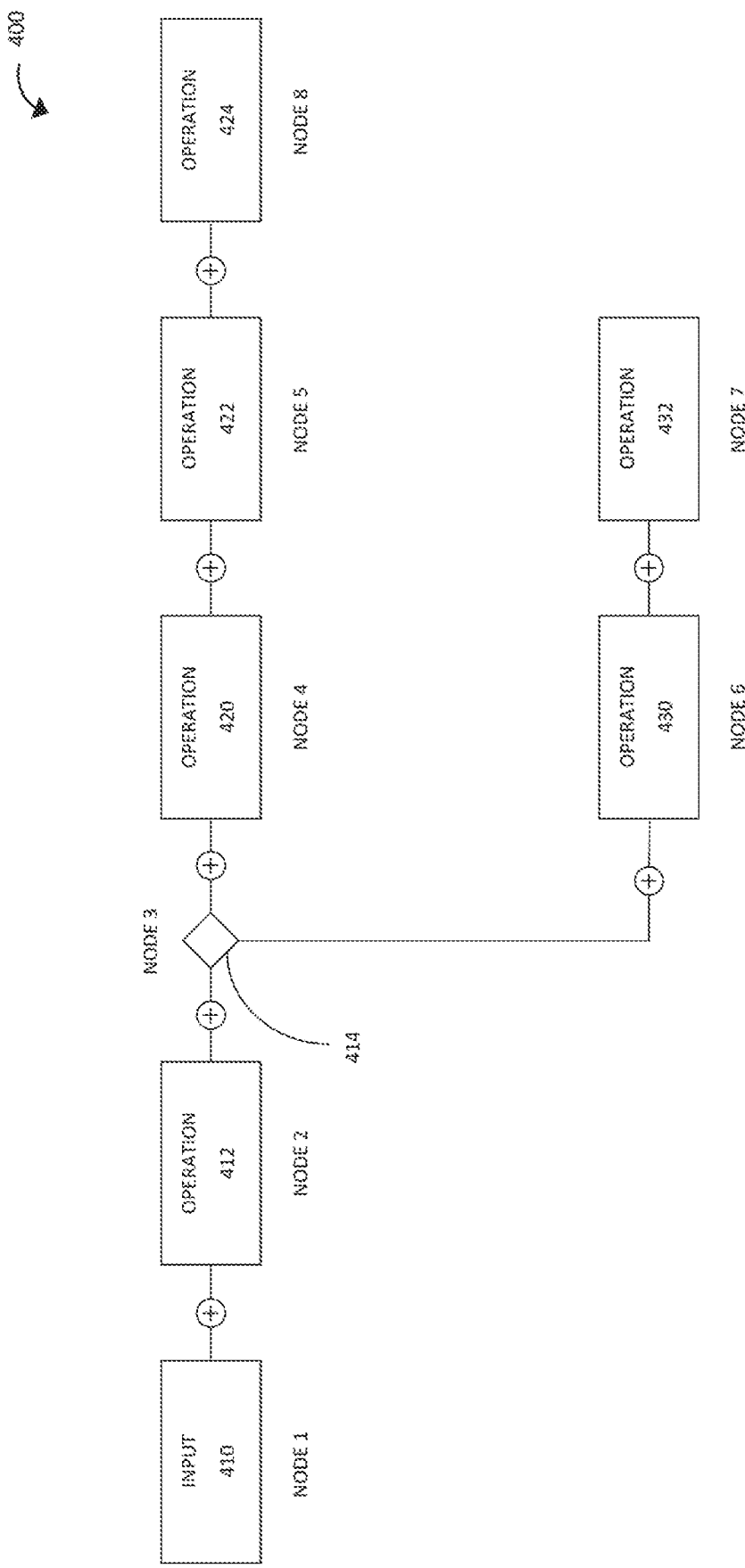
FIG. 4 is a schematic block diagram of an illustrative integration flow.

FIG. 4 shows an illustrative integration flow 400 for deployment in a cloud computing environment. As described above, integration flow 400 comprises a sequence of nodes comprising input/output nodes, operation nodes, and logic nodes. Each operation node defines a mapping or operation from one or more input operands to one or more outputs, which are added to the context for the subsequent node of the integration flow. Each logic node defines a mapping between one or more input operands and an output that determines a subsequent node along a particular one of two or more different routes or paths of the integration flow.

Illustrative integration flow 400 is triggered by an event and may be used, for example, for message processing. For instance, the triggering event may comprise receiving a particular type of message or similar notification such as an email or completed electronic form through a defined connector application (e.g., an associated email application), whereby the received message comprises the input data object for the integration flow. The integration flow 400 may then process the message or notification using other connector applications for a desired purpose.

Referring to FIG. 4, Node 1 of integration flow 400 comprises input operation 410 using a first connector application and the output of Node 1 adds the received data object (e.g., message or part thereof) to the context of the integration flow 400, as depicted by the "+" sign. Thus, the data object is stored in memory as the initial context of the particular message instance of the integration flow 400.

Node 2 of integration flow 400 comprises operation 412 using a second connector application, for processing the received message. For example, operation 412 may extract a hyperlink or similar identifier from the data object (i.e., receive message or part thereof) and use it to obtain a further data object through the second connector application. Thus, Node 2 utilizes one or more data fields from the initial context (i.e., received message) and adds the further data object (i.e., its outputs), obtained through the second connector application, to the context of the integration flow 400, as depicted by the "+" sign. Thus, the further data object is added to the context of the particular instance of the integration flow 400 and stored in memory. This type of operation is commonly called an "enrichment operation."

Node 3 of integration flow 400 comprises a logic node comprising a routing operation 414. Routing operation 414 defines a logic condition or similar decision step, the output of which determines a routing along one of two possible routes or paths through the integration flow 400. In other embodiments, there may be more than two possible routes or paths. For example, routing operation 414 may define a logic condition associated with a certain data field in the context (e.g., a condition based on the presence/absence or value of the data field). If the logic condition is met, integration flow 400 proceeds along a first route through Nodes 4, 5 and 8, whereas if the logic condition is not met integration flow proceeds along a second route through Nodes 6 and 7. In either case, Node 3 utilizes one or more data fields from the context and may optionally add data (e.g., data indicating whether or not the logic condition is met) to the context of the integration flow 400, as depicted by the respective "+" signs. Thus, further data may be added to the context of the particular instance of the integration flow 400 and stored in memory.

Nodes 4 and 5 of the integration flow 400 comprise operations 420 and 422 using respective third and fourth connector applications, for further processing the received message along the first route. For example, when the logic condition defined by Node 3 relates to the presence or absence of a particular data field, the first route may be used when the data field is absent so as to obtain the missing data. As with Node 2, each of the operations 420 and 422 utilizes one or more data fields from the context and adds data to the context of the integration flow 400, as depicted by the "+" signs. Node 8 then outputs the result of the particular instance of the integration flow 400 as output operation 424 using a fifth connector application. For example, output operation 424 may send an email message or store data in a database, according to the desired purpose of the integration flow 400.

Node 6 of the integration flow 400 comprises operation 430 using a sixth connector application, for further processing the received message along the second route. For example, when the logic condition defined by Node 3 relates to the presence or absence of a particular data field, the second route may be used when the data field is present. As with Node 2, operation 430 utilizes one or more data fields from the context and adds data to the context of the integration flow 400, as depicted by the "+" sign. Node 7 then outputs the result of the particular instance of the integration flow 400 as output operation 432 using a seventh connector application. For example, output operation 432 may send an email message or store data in a database, according to the desired purpose of the integration flow 400.

As the skilled person will appreciate, a two or more of Nodes 1 to 8 of integration flow 400 may use the same connector application, according to the desired purpose defined by the user. Furthermore, integration flow 400 is provided merely as an illustrative example. Other, more complex, integration flows, for instance comprising multiple logic nodes are possible and contemplated by the present disclosure.

Accordingly, illustrative integration flow 400 obtains and stores data objects from multiple connector applications in the context for each message instance. However, it is not possible to control the shape and size (i.e., the data fields and/or number of data fields) of the stored data objects using the integration flow 400, since such data objects typically originate from connectors such as third-party applications. This may lead to the storage in memory of large amounts of data in the context of the integration flow, including data fields of data objects that are not needed for the desired purpose of the integration flow.

In accordance with embodiments of the present disclosure, metadata associated with the nodes of the integration flow, determined from the analysis of an integration flow prior to runtime (e.g., static analysis as described above with reference to FIG. 3), may be used to reduce the memory usage by the integration flow during runtime, as described below with reference to FIG. 5.

Figure 5:
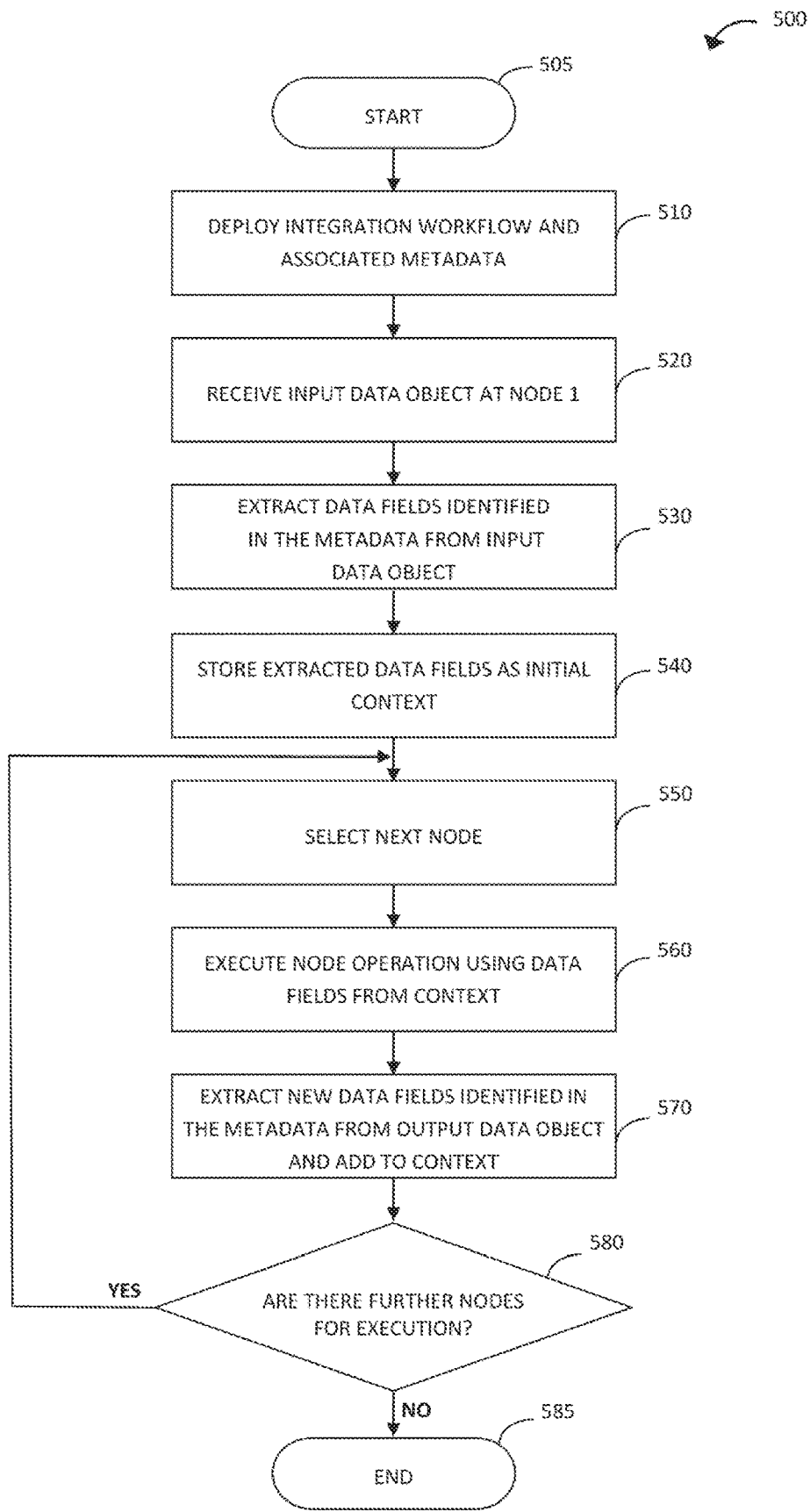
FIG. 5 is a flowchart of a method of executing an integration flow according to some example embodiments of the present disclosure.

FIG. 5 is a flowchart of a method 500 of executing an integration flow according to some example embodiments of the present disclosure. In particular, the method 500 is typically performed in a cloud computing environment according to a user-defined integration flow (e.g., the integration flow 400 of FIG. 4), using metadata derived from analysis of the integration flow definition (e.g., as described above with reference to FIG. 3). It is to be understood that the method can be implemented by (and, hence, can be performed by) a computer, a processor, a memory controller, firmware or software running on a computer system, or other component(s) of a computer system (such as computing system 600 or its components shown in FIG. 6.). Method 500 can include more or fewer blocks than those depicted. Method 500 can include blocks in different orders than those depicted, including one or more blocks occurring simultaneously.

The method 500 starts at 505. For example, method 500 may start in response to a user of an integration tool triggering the deployment a new or updated integration flow. At 510 the method deploys the integration flow and associated metadata derived from the analysis of the integration flow definition. In the example implementation, the metadata indicates, for each node, the data fields of the output data objects of that node that are used by the integration flow. Thus, the metadata comprises node identifiers and identifiers of associated data fields of the output data object.

Following 510, the deployed integration flow is configured for execution in the runtime environment.

At 520, an event trigger provides an input data object to a first node, Node 1, of the integration flow. For example, the event may comprise receiving a message or notification as an input data object, as described above with reference to FIG. 4. The input data object may comprise multiple data fields, of which only a subset of data fields is utilized by the integration flow. At 530, the method extracts all the data fields, that are defined in the usage metadata, from the output data object (which, in the case of an input operation corresponds to the input data object). The extracted data fields comprise input operands of any one or more of the subsequent nodes in the integration flow, irrespective of the route or path followed by the particular instance. At 540, the method stores the extracted data fields as the initial context in memory. At 540 the method may further discard the other data fields of the data object (e.g., by purging the corresponding data from a cache memory that temporarily stores the received data object).

At 550 the method selects the next node of the integration flow and at 560 executes the node operation using one or more data fields from the context as input operands. As described above, the node may perform an operation using a connector application to obtain further data objects (i.e., an enrichment operation) or a logic operation or similar decision step, the output of which determines whether a condition is met (i.e., a routing operation). Thus, during execution of the operation at 560, the node uses one or more of the data fields of the context currently stored in memory as input operands and may output a further data object (i.e., outputs of the node operation). At 570, the method extracts all the data fields, that are defined by the metadata, from the output data object, and adds the extracted data fields to the context stored in memory. At 570 the method may further discard the other data fields of the output data object (e.g., by purging the corresponding data from cache memory).

At 580, the method determines whether there are further nodes in the integration flow for execution. For example, the method may determine at 580 whether the current node is an output node, indicating that there are no further nodes, or at 580 may consider whether there is a subsequent node in a determined route in the integration flow. If the method determines at 580 that there are further nodes to consider, the method returns to 530 and selects a next node for execution. The method then continues in a loop through 550 to 580 until it determines at 580 that there are no further nodes to consider. When it is determined at 580 that there are no further nodes, the method ends at 585.

As a person of ordinary skill in the art will appreciate, in the example embodiment of FIG. 5, the method 500 only stores the data fields of the data objects output by each of the nodes that are required as part of the integration flow. Thus, the memory usage or "memory footprint" is improved or optimized to reduce the quantity of data for storage as the context of the integration flow. In example embodiments of the present disclosure, the stored context data may include data fields that are not utilized by every instance. In particular, the stored data includes the data required by all of the possible routes through the integration flow. This is preferable since it is not possible to know, in advance, which route will be followed in a particular instance. Nevertheless, the memory usage is significantly reduced by limiting the storage to defined data fields of data objects rather than storing the complete data objects as in conventional techniques. Example Referring again to the integration flow of FIG. 4, an example of how the method 500 of FIG. 5 may be implemented is as follows.

Assume that each node is configured with the following mappings/definitions:

Node1: provides the input data object as its output

Node2: uses in its configuration the value from Node1.field1

Node3: the condition is evaluated depending of the value of Node 2.field1 and the output is calculated from Node4.field1 and Node5.field2

Node4: configuration uses the values of Node2.field1 and Node2.field2.

Node5: configuration uses the values of Node2.field1 and Node2.field3.

Node6: configuration uses Node2.field3

Node7: configuration uses Node6.field1

Node8: configuration uses Node1.field3 and Node3.field 2 and Node3.field3

The static analysis of the integration flow definition (e.g., using the method 300 of FIG. 3) determines metadata comprising data fields associated with each node (i.e., the data fields of the output data object of each node that are utilized in the integration flow) as follows:

Node1: [field1, field3]

Node2: [field1, field2, field3]

Node3: [field2, field3]

Node4: [field1]

Node5: [field2]

Node6: [field1]

Node7: [ ]

Node8: [ ]

Accordingly, in this example, at Node1 (input operation 410 of FIG. 4), corresponding block 540 of the method 500 of FIG. 5 only stores the data fields: [field1, field3] of the output data object of Node1. Following execution of Node2 (operation 412 of FIG. 4) at block 560, block 570 of the method 500 only stores the data fields: [field1, field2, field3] of the output data object of Node2. Similarly, following execution of Node3 (logic operation 414 of FIG. 4) at block 560, block 570 of the method 500 only stores the data fields: [field2, field3] of the output data object of Node3. Following execution of Node4 (logic operation 420 of FIG. 4) and Node5 (logic operation 422 of FIG. 4) at block 560, block 570 of the method 500 only stores the data fields: Node4.field1 and Node5.field2, respectively. Following execution of Node6 (logic operation 430 of FIG. 4) at block 560, block 570 of the method 500 only stores the data field: [field1] of the output data object of Node6. Finally, following the execution of Nodes 7 and 8, block 570 of the method does not store any data fields from the output data object.

As a person of ordinary skill in the art will appreciate, the techniques of the present disclosure take advantage of the declarative nature of the mapping definition at each node of an integration flow. Accordingly, embodiments of the present disclosure are more effective when the variables and fields of data objects are explicitly specified by the user in the node definitions. Explicit definitions of data fields are possible based on identifiers such as names of data fields used by the associated connector application, such as name, address, quantity, price, and other identifying data fields. However, if a mapping definition uses some advanced features of the mapping language (e.g., predicates that evaluate to certain fields names) the metadata would specify that, for that node, the whole data object needs to be kept in the context rather than particular defined data fields. This would consume more memory resources that more explicit definitions, but memory reduction is nevertheless possible for the integration flow as a whole, where more explicit mapping definitions are present at other nodes. Furthermore, such complex types of mapping are thought to be relatively rare, so that, in most cases, a reduction of the amount of data of the data objects retained in the context in memory is likely, in comparison to conventional techniques. As a person of ordinary skill in the art will appreciate, the smaller the fraction of a data object from the context that is used later in the integration flow, the bigger the memory savings.

Figure 6:
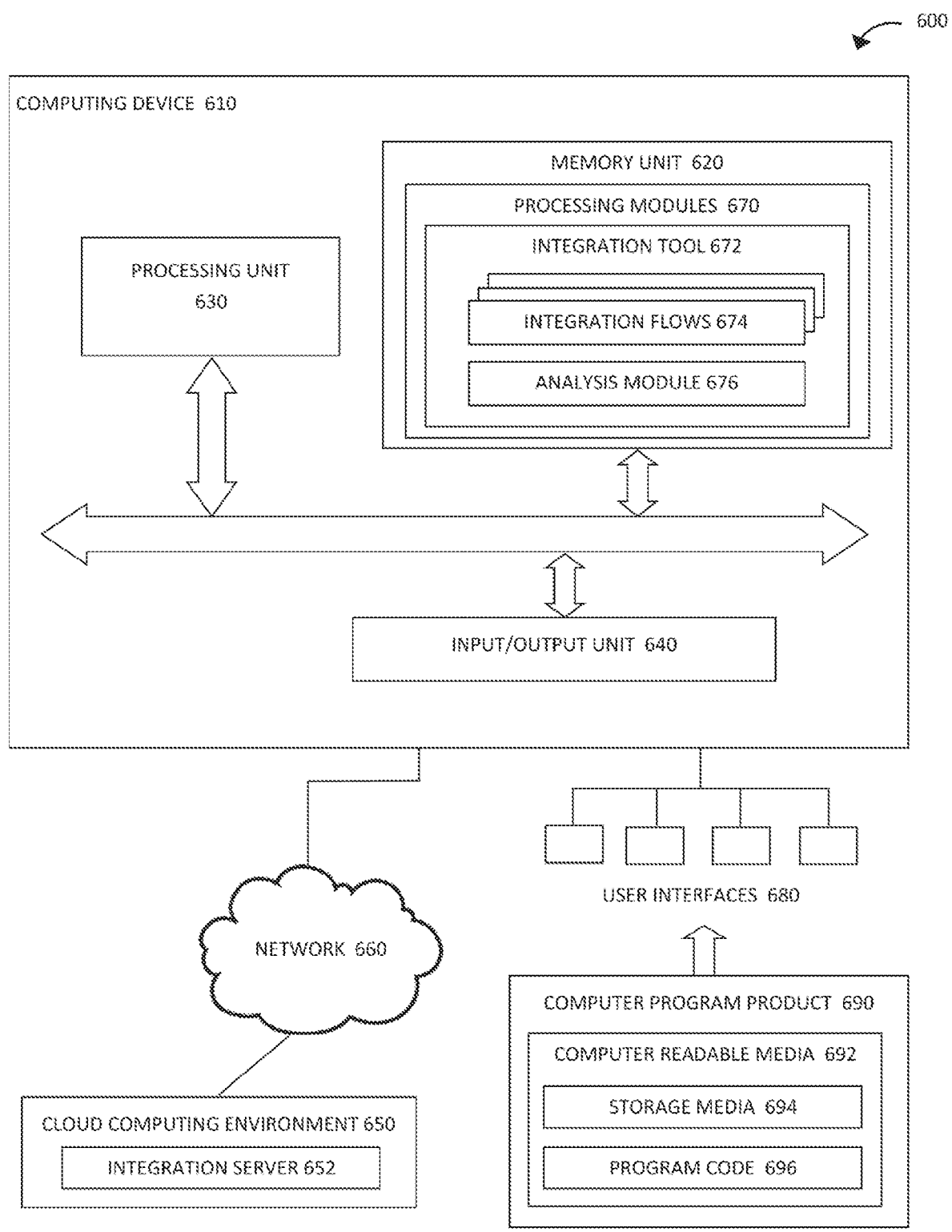
FIG. 6 is a block diagram of a system according to some example embodiments of the present disclosure.

FIG. 6 shows a computing system 600 in accordance with an example implementation of the present disclosure. In particular the computing system 600 comprises a computing device 610 having a memory unit 620, a processing unit 630 and an input/output (I/O) unit 640. Computing device 610 may be any type of user device, such as a personal computer, notebook computer, tablet computer, smartphone, or other type of user computing device, whether now known or developed in the future. Computing device 610 further includes user interface devices 680 connected to I/O unit 640 or integrated within computing device 610. User interface devices 680 may include one or more of a display (e.g., screen or touchscreen), a printer, a keyboard, a pointing device (e.g., mouse, joystick, touchpad), an audio device (e.g. microphone and/or speaker), and any other type of user interface device. I/O unit 640 is also configured to be connected to a network 660 to send data to, and receive data from, other computing devices connected to the network 660. In particular, network 660 may be connected to a cloud computing environment 650 including an integration server 652. Network 660 may comprise any suitable wired and/or wireless data communications network, such as a local area network, wide area network, or the Internet.

Memory unit 620 of computing device 610 may include processing modules 670. Each processing module 670 comprises instructions for execution by processing unit 630 for processing data and/or instructions received from I/O unit 640 and/or data and/or instructions stored in memory unit 620. In accordance with an example embodiment of the present disclosure, processing modules 670 comprise an integration tool 672, which allows the user to define one or more integration flows 674. Processing modules 670 can also include instructions for implementing one or more of the functions described with respect to FIG. 5. Suitable integration tools 672 are known in the art. For example, a suitable integration tool is the user tool associated with the cloud-based integration solution "App Connect" of IBM Corporation.

In accordance with an example implementation of the present disclosure, unlike convention integration tools, integration tool 672 is enhanced to include analysis module 676 for analyzing an integration flow 674 to determine metadata in accordance with the methods disclosed herein, prior to deployment of the integration flow 674. In particular, analysis module 676 may comprise instructions for performing at least part of the functions described above with respect to the method of FIG. 3. In the illustrated example implementation, analysis module 676 is integrated within the integration tool 672. In other example implementations, analysis module 676 may be an independent processing module 670, which is executed in response to a user action associated with the integration tool 672 or otherwise.

Referring again to FIG. 6, a computer program product 690 may be provided. The computer program product 690 may include computer readable media 692 having storage media 694 and program instructions 696 (i.e., program code) embodied therewith. The program instructions 696 may be loaded onto memory unit 620 of computing device 610 via I/O unit 640, for example by one of user interface devices 680. The program instructions 696 may comprise analysis module 676 for use with integration tool 672 for determining metadata for an integration flow 674, for example in accordance with the method of FIG. 3 as described above. The metadata determined for an integration flow 674 may then be stored in memory with the integration flow 674. A user of computing device 610 may use the integration tool 672 to deploy the integration flow 674 and associated metadata in the cloud computing environment 650. In particular, the computing device 610 may send the integration flow 674 and associated metadata via I/O unit 640 over network 660 to integration server 652 in cloud computing environment 650. The integration server 652 may then cause the integration flow 674 to be executed using the metadata determined by the analysis module 676, so as to minimize the use of memory resources as described herein. For example, integration server 652 may cause the integration flow 674 to be executed in accordance with the method of FIG. 5 as described above.

As a person of ordinary skill in the art will appreciate, the user may construct the integration flow 674 using the integration tool 672, by selecting the trigger and the connectors and operations that will process the trigger message, and defining the inputs to these operations by defining mappings that use the input message and the data from the context. On deployment of integration flow 674 to the integration server 652 by the user, the integration flow is saved in memory (not shown) associated with the integration server 652.

Accordingly, in example embodiments of the present disclosure, the usage metadata for an integration flow 674 is determined (e.g., as described above) and stored alongside the integration flow 674 in memory associated with the integration server 652. When a message is received, the integration server 652 examines its storage to establish if there are any flows 674 to process the message. If one or more such flows 674 are found, the integration server 652 can initiate the execution of these flows. In particular, for each integration flow 674 for the input message, the integration server 652 can examine the metadata and add to the context a subset of the data in the input message that contains all the fields of the usage metadata (i.e., corresponding to all the data fields of the input message that might be used by the flow). The rest of the input message is discarded for the respective integration flow 674. Then the integration server 652 then executes each flow as described above.

As a person of ordinary skill in the art will appreciate, in other embodiments, the usage metadata may not be stored along the integration flow, but instead may be computed when the integration server identifies that a flow will process a message received. At that moment, the server can compute the metadata on the fly, and then proceed to process the integration flow as described above.

Whilst FIG. 6 shows the integration tool 674 within a separate user computing system 610, in other example implementations the integration tool 674 may be included in the integration server 652. In this case, the integration tool 674 may be accessible to the user of computing system 610 from the integration server 652 over the network 650 (e.g., using a web browser).

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the example implementations, the practical application or technical improvement over technologies found in the marketplace, or to enable others of ordinary skill in the art to understand the embodiments disclosed herein.

What is claimed is:

1. A computer-implemented method, comprising:
    receiving metadata associated with an integration flow comprising a sequence of nodes, the metadata identifying a set of data fields for data objects used by the nodes of the integration flow;
    receiving, in response to initiation of the integration flow, an input data object including a plurality of data fields;
    extracting, from the input data object, initial context data for the integration flow based on the metadata, the initial context data including data fields occurring within the set of data fields for the metadata and the plurality of data fields included in the input data object;
    processing the context data at each of the nodes of the integration flow, wherein one or more of the nodes adds data fields from its output data object to the context data based on the metadata, the data fields added from the nodes occurring within the set of data fields for the metadata; and
    discarding remaining data fields from the output data objects of one or more of the nodes which was not added to the context data based on the metadata, the remaining data fields discarded from the output data objects being data fields excluded from the set of data fields for the metadata of the integration flow.

2. The method of claim 1, further comprising:
    storing the context data in memory associated with the integration flow.

3. The method of claim 1, wherein the metadata comprises an identifier of one or more data fields of an output data object of a node of the integration flow, and an associated identifier of the corresponding node of the integration flow.

4. The method of claim 3, wherein processing the context data at each of the nodes of the integration flow comprises:
    receiving, at a node, context data from a previous node of the sequence of nodes of the integration flow;
    processing the received context data in accordance with a node definition to determine an output data object of the node;
    extracting the data fields of the output data object identified in the metadata, and
    adding the extracted data fields to the context data of the integration flow.

5. The method of claim 1, wherein processing the context data at one of the nodes comprises:
    running a connector application associated with the node; and
    obtaining one or more data objects from the connector application, wherein the one or more data objects are defined by the connector application.

6. The method of claim 1, wherein the nodes are selected from the group consisting of: input nodes, output nodes, operation nodes, and logic nodes.

7. The method of claim 1, wherein the integration flow is initiated in response to a condition selected from the group consisting of: a triggering event, a condition associated with an application programming interface (API), data synchronization, and data replication.

8. The method of claim 1, wherein the metadata is determined by analysis of the integration flow and identifies the data fields in one or more data objects returned by each node that might be used by one or more of the subsequent nodes of the integration flow.

9. A system, comprising:
a processor for processing data associated with an integration flow comprising a sequence of nodes, and memory for storing data associated with the integration flow, wherein the processor is configured to:
receive metadata associated with an integration flow comprising a sequence of nodes, the metadata identifying a set of data fields for data objects used by the nodes of the integration flow;
receive, in response to initiation of the integration flow, an input data object including a plurality of data fields;
extract, from the input data object, initial context data for the integration flow based on the metadata, the initial context data including data fields occurring within the set of data fields for the metadata and the plurality of data fields included in the input data object;
process the context data at each of the nodes of the integration flow, wherein one or more of the nodes adds data fields from its output data object to the context data based on the metadata, the data fields added from the nodes occurring within the set of data fields for the metadata; and
discard remaining data fields from the output data objects of one or more of the nodes which was not added to the context data based on the metadata, the remaining data fields discarded from the output data objects being data fields excluded from the set of data fields for the metadata of the integration flow.

10. The system of claim 9, wherein the processor is further configured to store the context data in the memory associated with the integration flow.

11. The system of claim 9, wherein the metadata comprises an identifier of one or more data fields of an output data object of a node of the integration flow, and an associated identifier of the corresponding node of the integration flow.

12. The system of claim 11, wherein the processor is configured to process the context data at each of the nodes of the integration flow by:
receiving, at a node, context data from a previous node of the sequence of nodes of the integration flow;
processing the received context data in accordance with a node definition to determine an output data object of the node;
extracting the data fields of the output data object identified in the metadata, and
adding the extracted data fields to the context data of the integration flow.

13. The system of claim 9, wherein the processor is configured to process the context data at one of the nodes by:
running a connector application associated with the node; and
obtaining one or more data objects from the connector application, wherein the one or more data objects are defined by the connector application.

14. The system of claim 9, wherein the nodes are selected from the group consisting of: input nodes, output nodes, operation nodes, and logic nodes.

15. The system of claim 9, wherein the integration flow is initiated in response to a condition selected from the group consisting of: a triggering event, a condition associated with an application programming interface (API), data synchronization, and data replication.

16. The system of claim 9, wherein the metadata is determined by analysis of the integration flow and identifies the data fields in one or more data objects returned by each node that might be used by one or more of the subsequent nodes of the integration flow.

17. A computer program product comprising a computer readable storage medium having program instructions embodied therewith, wherein the program instructions are executable by a processor to cause the processor to:
receive metadata associated with an integration flow comprising a sequence of nodes, the metadata identifying a set of data fields for data objects used by the nodes of the integration flow;
receive, in response to initiation of the integration flow, an input data object including a plurality of data fields;
extract, from the input data object, initial context data for the integration flow based on the metadata, the initial context data including data fields occurring within the set of data fields for the metadata and the plurality of data fields included in the input data object;
process the context data at each of the nodes of the integration flow, wherein one or more of the nodes adds data fields from its output data object to the context data based on the metadata, the data fields added from the nodes occurring within the set of data fields for the metadata; and
discard remaining data fields from the output data objects of one or more of the nodes which was not added to the context data based on the metadata, the remaining data fields discarded from the output data objects being data fields excluded from the set of data fields for the metadata of the integration flow.

18. The computer program product of claim 17, wherein the metadata comprises an identifier of one or more data fields of an output data object of a node of the integration flow, and an associated identifier of the corresponding node of the integration flow.

19. The computer program product of claim 18, wherein the program instructions are executable by a processor to cause the processor to process the context data at each of the nodes of the integration flow by:
receiving, at a node, context data from a previous node of the sequence of nodes of the integration flow;
processing the received context data in accordance with a node definition to determine an output data object of the node;
extracting the data fields of the output data object identified in the metadata, and
adding the extracted data fields to the context data of the integration flow.

20. The computer program product of claim 17, wherein the program instructions are executable by a processor to cause the processor to process the context data at one of the nodes by:
running a connector application associated with the node; and
obtaining one or more data objects from the connector application, wherein the one or more data objects are defined by the connector application.

\* \* \* \* \*